(No Model.)

H. ANDERSON.
Safety Nut for the Axles of Vehicles, &c.

No. 235,060. Patented Dec. 7, 1880.

WITNESSES
Wilmer Bradford
Edward McClain

INVENTOR
Henry Anderson.
By C. W. M. Smith
Attorney

UNITED STATES PATENT OFFICE.

HENRY ANDERSON, OF SAN FRANCISCO, ASSIGNOR TO JACKSON WILCOXSON, OF YOLO COUNTY, CALIFORNIA.

SAFETY-NUT FOR THE AXLES OF VEHICLES, &c.

SPECIFICATION forming part of Letters Patent No. 235,060, dated December 7, 1880.

Application filed May 24, 1880. (No model.)

*To all whom it may concern:*

Be it known that I, HENRY ANDERSON, of San Francisco, in the county of San Francisco and State of California, have invented a new and useful Safety Nut or Washer for the Axles of Vehicles, and for other like purposes, of which the following is a specification.

My invention relates to a safety-nut for the axles of vehicles, to prevent the wheels from coming off and allowing the axle to drop or fall to the ground, whereby so many and ofttimes fatal accidents take place.

It consists in constructing the nut or washer in two parts, and forming a screw-thread upon the outer end thereof, over which a screw cap or head is placed, firmly connecting the two parts of the washer and holding them in position upon the end of the axle.

Figure 1:
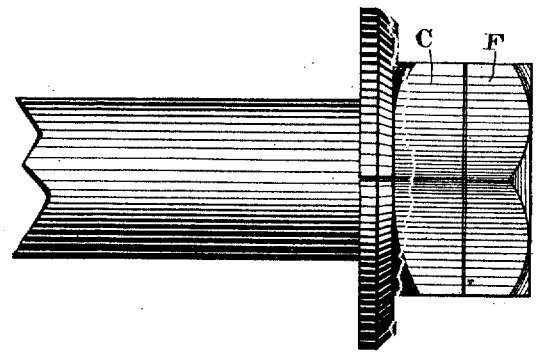
Figure 2:
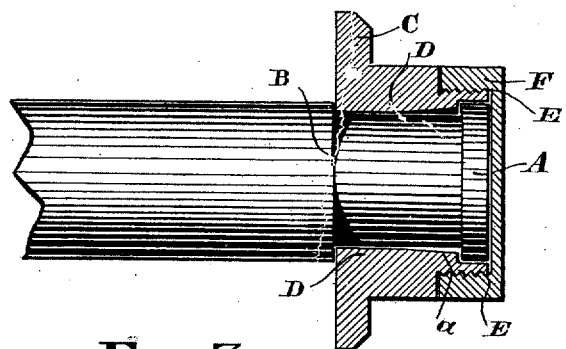
Figure 3:
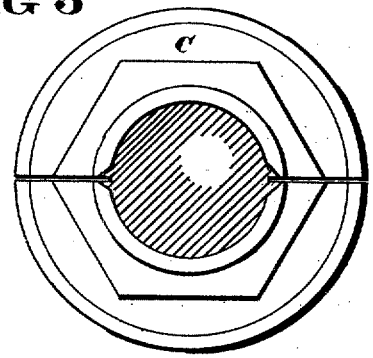

In the accompanying drawings, Figure 1 is a side elevation; Fig. 2, a horizontal section of my nut or washer and axle. Fig. 3 is a plan, in section.

I construct the ends of my axle without threads, and similar to that of the wheel-bearing ends of railway-axles, provided with collars A and shoulders B.

The nut or washer C is divided lengthwise, and the inner corners of the part D are beveled at *a*, so that when the parts are united a channel for the lubricant is formed between the parts of the nut and the axle at two points above and beneath the journal.

Upon the outer end of the two parts of the nut I cut a screw-thread, E, which receives the female screw of the cap F, so that when all the parts are united and the cap turned up against the shoulder of the divided nut, it is in appearance like that of the ordinary nut of a vehicle.

In practice the nut or washer should not be made to fit so closely against the shoulders of the journal as to prevent the lubricant from entering the bearing parts, as the nut will move on the journal and collar at intervals, or when hardly pressed against by the outer end of the hub or nave of the wheel, and more especially will this take place when the position of the vehicle or axle is inclined.

It should here be observed that my invention is adapted not alone to vehicles, but may be applied to shafting and other engines having end bearings.

Having thus described my invention, what I claim, and desire to secure by Letters Patent, is—

In combination with the end bearings of vehicle and other axles having a shoulder and collar, a longitudinally-divided nut or washer provided with a screw-cap upon its outer end, for the purpose of retaining the two parts of the washer in position upon the axle between said shoulder and collar, as specified.

In testimony that I claim the foregoing I have hereunto set my hand and seal this 30th day of April, 1880.

HENRY ANDERSON. [L. S.]

Witnesses:
C. W. M. SMITH,
W. P. COLEMAN.